United States Patent
Tesavis et al.

(10) Patent No.: US 7,428,084 B2
(45) Date of Patent: Sep. 23, 2008

(54) SCANNER WITH REMOVABLE IMAGE GUIDES

(75) Inventors: Carl J. Tesavis, Spencerport, NY (US); Scott P. Haude, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 988 days.

(21) Appl. No.: 10/763,599

(22) Filed: Jan. 23, 2004

(65) Prior Publication Data

US 2005/0162710 A1  Jul. 28, 2005

(51) Int. Cl.
*H04N 1/04* (2006.01)

(52) U.S. Cl. .................. 358/474; 358/498; 358/497; 358/496; 271/121; 355/317; 355/76; 399/367; 399/203

(58) Field of Classification Search .............. 358/498, 358/474; 271/202, 272, 270, 246, 207, 296; 399/374, 367, 302, 94; 355/311, 309
See application file for complete search history.

(56) References Cited

U.S. PATENT DOCUMENTS

| | | | | |
|---|---|---|---|---|
| 4,360,278 A * | 11/1982 | Paque | ...................... | 400/134.3 |
| 5,214,470 A | 5/1993 | Denber | | |
| 5,289,234 A * | 2/1994 | Asano et al. | ................ | 399/113 |
| 5,399,850 A * | 3/1995 | Nagatani et al. | ......... | 250/208.1 |
| 5,689,775 A * | 11/1997 | Marumoto | .................. | 399/121 |
| 5,774,760 A * | 6/1998 | Nagashima | .................. | 399/39 |
| 5,864,408 A * | 1/1999 | Kumashiro | .................. | 358/461 |
| 6,640,082 B2 * | 10/2003 | Mitomi | ...................... | 399/374 |
| 6,657,754 B2 * | 12/2003 | Rapkin et al. | ................ | 358/496 |
| 7,130,088 B2 * | 10/2006 | Breslawski et al. | ......... | 358/474 |
| 7,142,335 B2 * | 11/2006 | Tesavis | ....................... | 358/474 |
| 7,290,763 B2 * | 11/2007 | Suzuki et al. | ............... | 271/9.13 |
| 7,356,282 B2 * | 4/2008 | Deguchi | ..................... | 399/111 |
| 2001/0016133 A1 * | 8/2001 | Hirota et al. | ................. | 399/374 |
| 2001/0043370 A1 * | 11/2001 | Rapkin et al. | ................ | 358/471 |
| 2002/0036375 A1 * | 3/2002 | Matsuda | .................... | 271/3.14 |
| 2003/0210433 A1 * | 11/2003 | Westcott et al. | ............. | 358/474 |
| 2004/0012825 A1 * | 1/2004 | Tesavis | ....................... | 358/474 |

FOREIGN PATENT DOCUMENTS

| | | |
|---|---|---|
| EP | 810 171 A2 | 12/1998 |
| EP | 1 313 304 A2 | 5/2003 |
| GB | 2 069 982 A | 9/1981 |
| JP | 2001-233469 | 8/2001 |
| JP | 2002-300347 | 10/2002 |

* cited by examiner

*Primary Examiner*—Edward L Coles
*Assistant Examiner*—Negussie Worku
(74) *Attorney, Agent, or Firm*—Nelson A. Blish

(57) ABSTRACT

A scanner has a transport system for transporting a document along a transport path for scanning by at least a first camera. A first removable image guide is disposed between the first camera and a first side of the document. The first removable image guide has a first manifold with a first patter of holes for applying a first level of air pressure or vacuum to the document. Replacement of the first removable image guide with an upgrade removable image guide provides an alternate manifold with an alternate pattern of holes that provide a second level of air pressure or vacuum to the document, different from the first level.

4 Claims, 5 Drawing Sheets

SCANNER WITH REMOVABLE IMAGE GUIDES

FIELD OF THE INVENTION

The present invention relates in general to scanners and in particular to removable image guides in scanners.

BACKGROUND OF THE INVENTION

Most document scanners include transparent surfaces through which the cameras receive an optical image of a document. This is done by either reflecting light off the surface of the document or transmitting light through the document. In many cases these transparent surfaces, often referred to as imaging guides, are designed by the scanner manufacturer to be wear items, which are field replaceable by either the customer or field service engineer.

It is often desirable to add upgrades to equipment presently in the field. This is difficult, however, because configurations are crowded and difficult to change without major overhaul of equipment. It would be desirable to use parts which are currently replaceable for maintenance to add upgrades to the paper feed path in pre-installed equipment.

SUMMARY OF THE INVENTION

Briefly, according to one aspect of the present invention a scanner comprises a transport system for transporting a document through the scanner. A first removable image guide is on a first side of the document. A camera captures an image of the document as it passes below the image guide. The first removable image guide incorporates a first upgrade feature.

The purpose of this invention is to take advantage of the fact that image guides are field replaceable by using them as a platform to deliver new mechanical functionality to an installed base of document scanners. This includes, but is not limited to, such devices as mechanical wipers for flattening the subject document, air pressure, vacuum delivery systems for cooling, paper control or dust control of the document transport near the imaging guide area, dust removal wipers for cleaning the documents prior to entering the image guide area, or combinations of these features.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
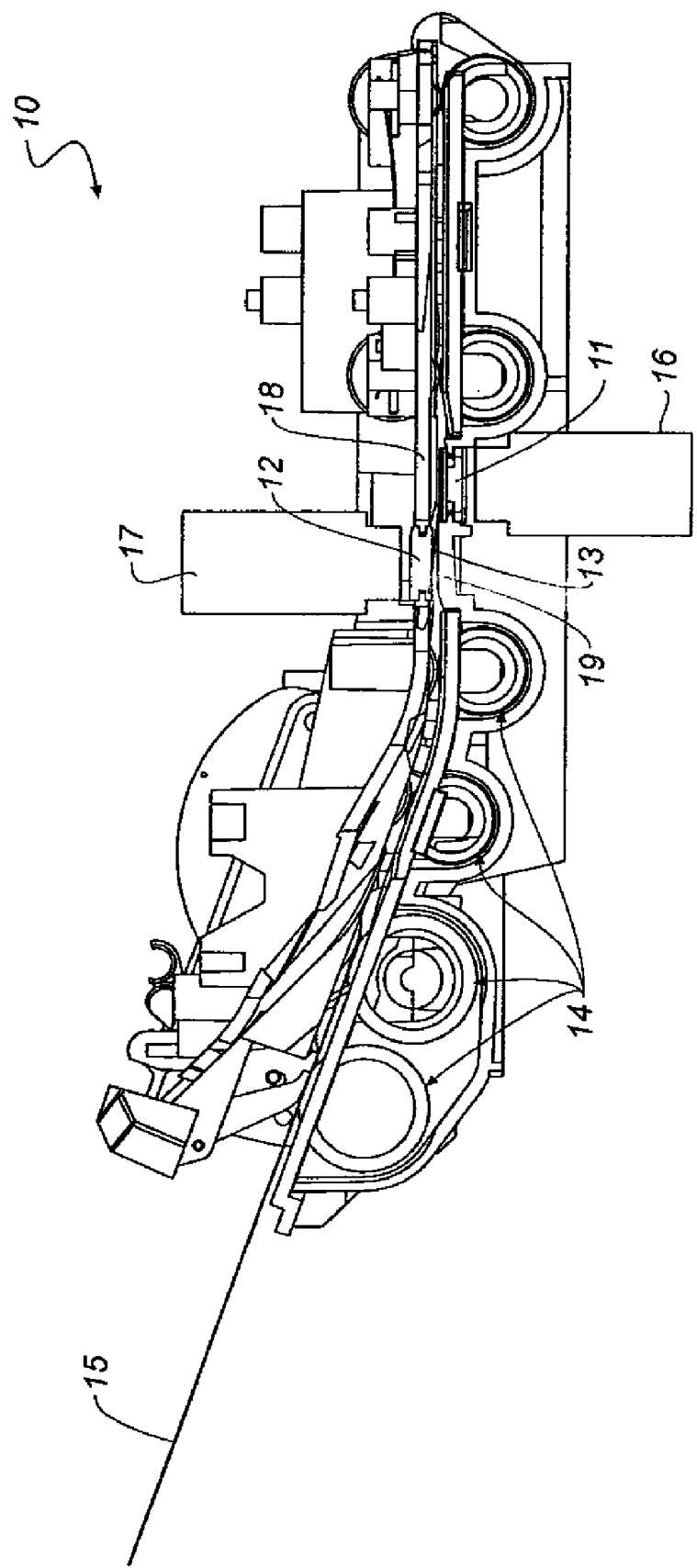
FIG. 1 is a side schematic view of the paper feed path for a scanner according to the present invention.
Figure 2:
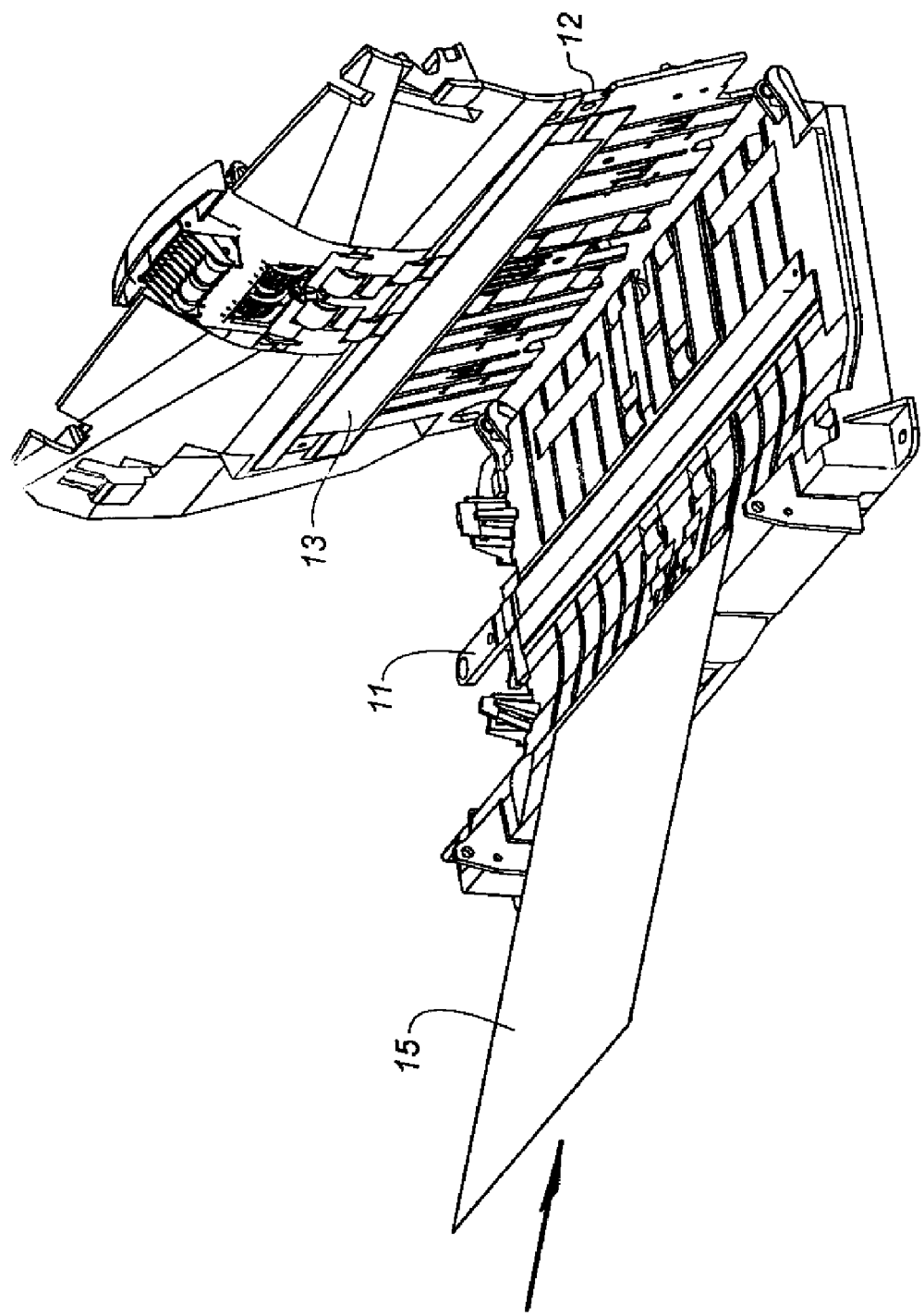
FIG. 2 is a perspective view of one embodiment of the paper feed path for a scanner according to the present invention.

Referring now to FIGS. 1 and 2, a scanner 10 has a transport system 14 for transporting a document 15 through the scanner. A lower removable image guide 11 is located on the front side of the document 15. A lower camera 16 captures an image of the front of the document 15 as it passes below the lower image guide 11. A second upper image guide 12 is located on the rear side of the document 15. An upper camera 17 captures and image of the rear side of the document 15.

The lower image guide 11, or upper image guide 12, or both may incorporate at least one upgrade feature. The upgrade feature shown in FIG. 1 is a wiper 13. In this case, the wiper is a piece of material attached to the removable upper image guide 12, which applies a force to the document 15 forcing it in close contact with the lower image guide 11. This wiper may be required for applications of the scanner when mottling resulting from the ability of the document 15 to move and form curved surface, which tend to reflect light in a non-uniform manner resulting in undesirable variations in the uniformity of the resultant image. In this case the wiper 13 minimizes this effect.

This wiper can be installed in the field by a customer simply by removing the standard upper image guide 12 and replacing it with one containing the wiper upgrade feature 13. These types of scanner enhancements can be delivered to an installed base of scanner products at some time later than the initial design of the scanner device and installed by the customer at their convenience.

Figure 4:
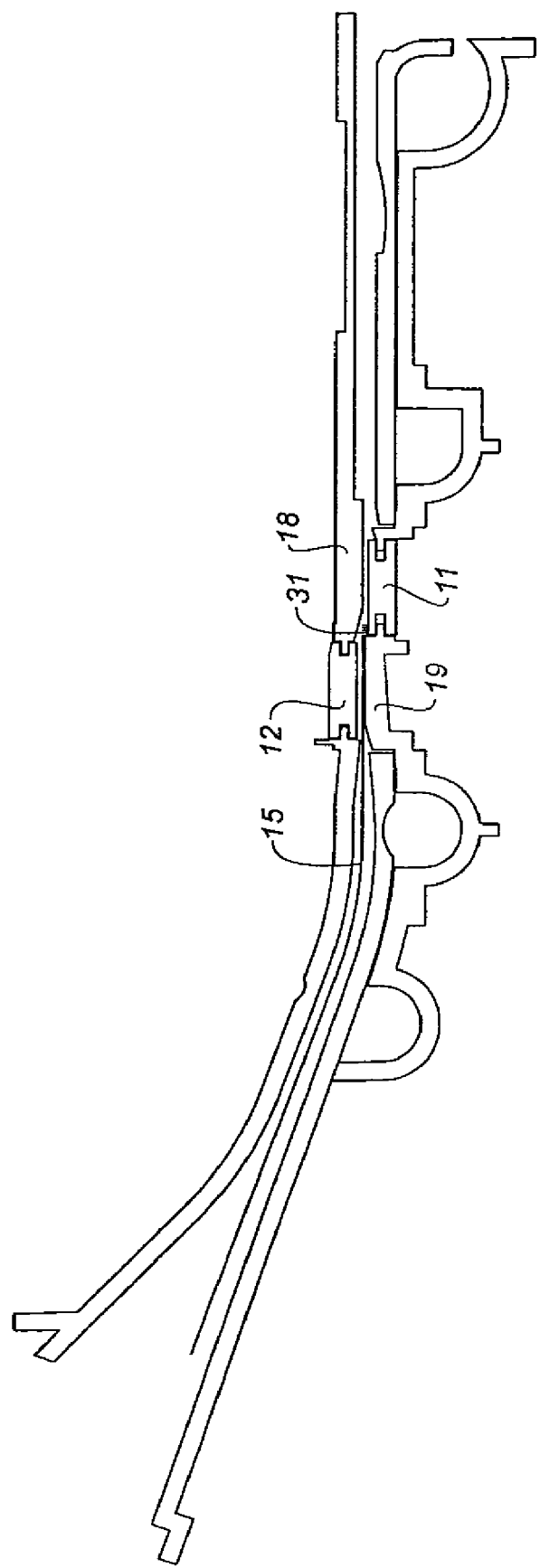
FIG. 4 is a side view of a replacement image guide having increased thickness.

A number upgrade features using this delivery mechanism is envisioned. For example a second upgrade feature is depicted in FIG. 4. This upgrade feature provides an additional thickness on material on the removable lower image guide 11 forming a thickness wiper 31 for the purpose of maintaining the document 15 in close contact with the surface of the baffle 18 opposite the lower image guide 11 for the purpose of flattening the document 15 for imaging by the lower camera 16.

Figure 5:
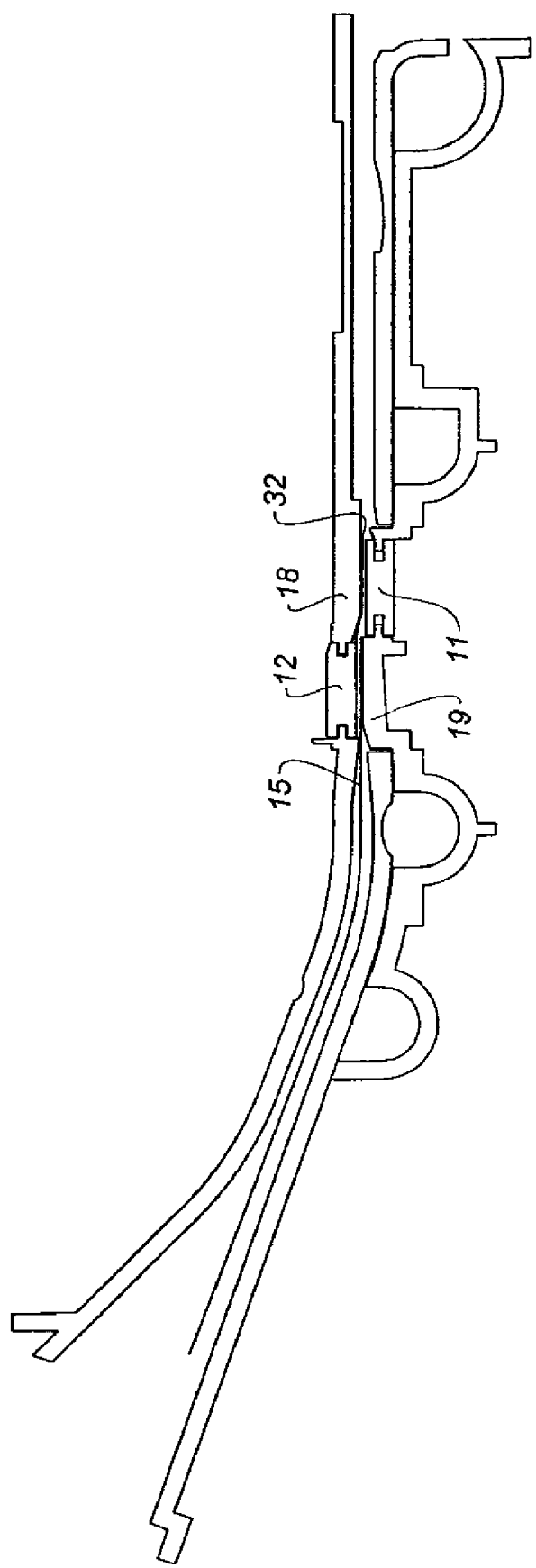
FIG. 5 is a side view of a replacement image guide with a colored background.

A third example of an upgrade feature is depicted in FIG. 5. The purpose of this upgrade feature is to provide a nonstandard background color on baffle 18, i.e., black, white, or some other color. This could be done by including a colored piece of material 32 as part of the opposing sides of the removable lower image guide 11 or upper image guide 12, which changes the color of the baffle surface 18, or baffle surface 19, or both viewed by the lower camera 16, or upper camera 17, or both.

Figure 3:
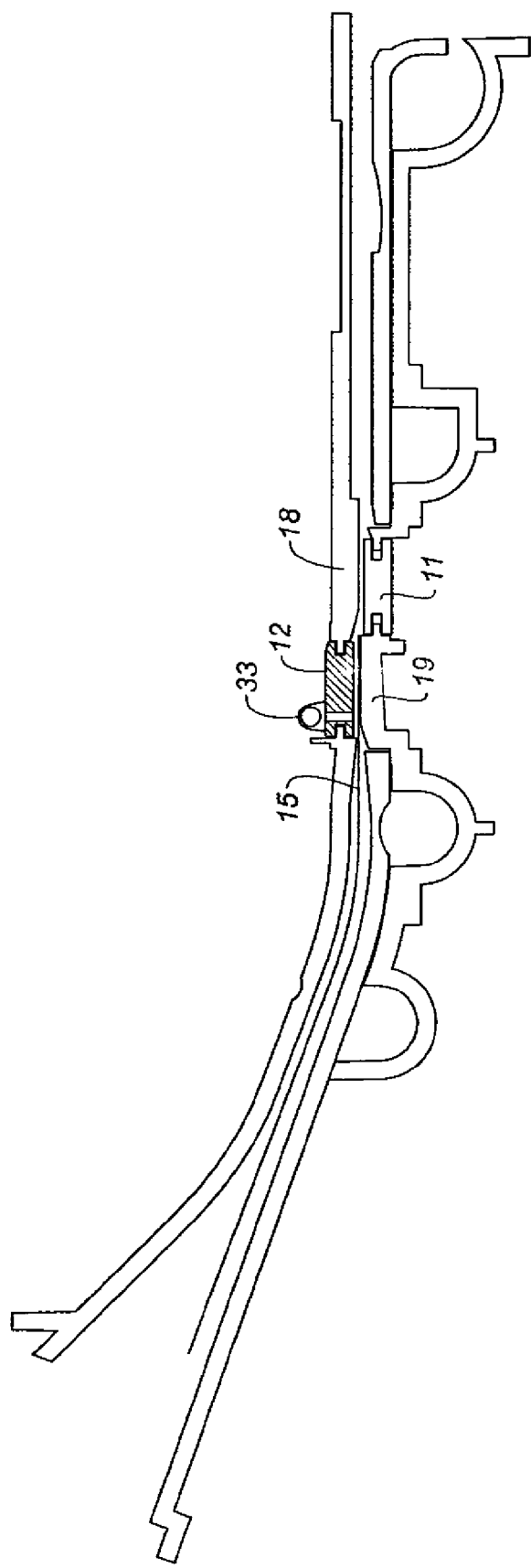
FIG. 3 is a side view of a replacement image guide showing manifold holes.

A fourth example of an upgrade feature is depicted in FIG. 3. A manifold 33 is formed by series of channels with holes cut in the removable image guides 11 and 12 outside of the imaging area. The manifold would be employed to deliver pressure or vacuum for removing dust from the document 15. Pressure or vacuum can also be delivered through manifold 33 for the purpose of maintaining the document 15 in close contact with the image guides 11 and 12 for the purpose of minimizing mottling in the image.

This invention takes advantage of the replaceable nature of the image guides typically found in the designs of document scanners to deliver asynchronously from the original development process future unforeseen mechanical enhancements. This can be done for the future installed base of scanners as well as in the original design.

The invention has been described in detail with particular reference to certain preferred embodiments thereof, but it will be understood that variations and modifications can be effected within the scope of the invention.

PARTS LIST

- 10 scanner
- 11 lower image guide
- 12 upper image guide
- 13 wiper
- 14 transport system
- 15 document
- 16 lower camera
- 17 upper camera
- 18 baffle
- 19 baffle
- 31 thickness wiper
- 32 color background
- 33 manifold

What is claimed is:

1. A scanner comprising:
   a transport system for transporting a document along a transport path for scanning by at least a first camera;
   a first removable image guide disposed between the first camera and a first side of said document, wherein the first removable image guide comprises a first manifold with a first pattern of holes for applying a first level of air pressure or vacuum to the document; and
   an upgrade removable image guide, wherein replacement of the first removable image guide with the upgrade removable image guide provides an alternate manifold with an alternate pattern of holes that provide a second level of air pressure or vacuum to the document, wherein the second level differs from the first level.

2. The seamier as in claim 1 wherein the first pall em of holes lies outside the imaging area of the first camera.

3. The scanner as in claim 1 comprising:
   a second camera; and
   a second removable image guide disposed between the second camera and a second side of said document, wherein the upgrade removable image guide further incorporates a second manifold with a second pattern of holes for applying air pressure or vacuum to the document.

4. A method for scanning a document comprising:
   interchangeably installing either a first removable image guide or an upgrade removable image guide between a first camera and a transport path for the document, wherein the first removable image guide comprises a first manifold having a first pattern of holes for applying pressure or vacuum and wherein the upgrade removable image guide comprises an alternate manifold having an alternate pattern of holes;
   transporting said document past the first camera while applying air pressure or vacuum through either the first manifold or alternate manifold accordingly; and
   wherein the alternate manifold provides a different pressure or vacuum level than does the first manifold.

* * * * *